United States Patent [19]

Castonguay

[11] 4,443,676

[45] Apr. 17, 1984

[54] INTERCHANGEABLE SHIELD ARRANGEMENT FOR A CIRCUIT BREAKER COMPARTMENT

[75] Inventor: Roger N. Castonguay, Terryville, Conn.

[73] Assignee: General Electric Company, New York, N.Y.

[21] Appl. No.: 322,348

[22] Filed: Nov. 18, 1981

[51] Int. Cl.³ .......................................... H02B 11/04
[52] U.S. Cl. .................................. 200/304; 361/345; 200/50 AA
[58] Field of Search .................... 200/304, 305, 50 R, 200/50 AA; 361/335, 339, 343, 345

[56] References Cited

U.S. PATENT DOCUMENTS

| | | | |
|---|---|---|---|
| 3,121,144 | 2/1964 | Tjebben | 200/50 AA |
| 3,614,350 | 10/1971 | Eichelberger | 200/50 AA |
| 3,920,939 | 11/1975 | Ciboldi | 361/345 |
| 4,183,073 | 1/1980 | Clausing | 200/50 AA |
| 4,285,026 | 8/1981 | Clausing | 200/50 AA |

Primary Examiner—G. P. Tolin
Attorney, Agent, or Firm—R. A. Menelly; W. C. Bernkopf; Fred Jacob

[57] ABSTRACT

A shield unit for interchangeable fit within circuit breaker compartments of various manufacture contains a split linkage arrangement of two pivotally connected arms, a return spring and a connecting spring to operate a shield linkage mechanism. The shield assembly comprises two moveable shields brought into a closed configuration when a circuit breaker is removed from the breaker compartment and into an open configuration when the circuit breaker is inserted within the breaker compartment. The interposition of the moveable shields between the power stabs within the breaker compartment and the breaker plugs prevents inadvertent contact by an operator when the circuit breaker unit is disconnected from the stabs. A balanced arrangement of shield linkage mechanisms on both sides of the shield unit prevents manual operation by an operator in any attempt to bypass the shield unit.

20 Claims, 6 Drawing Figures

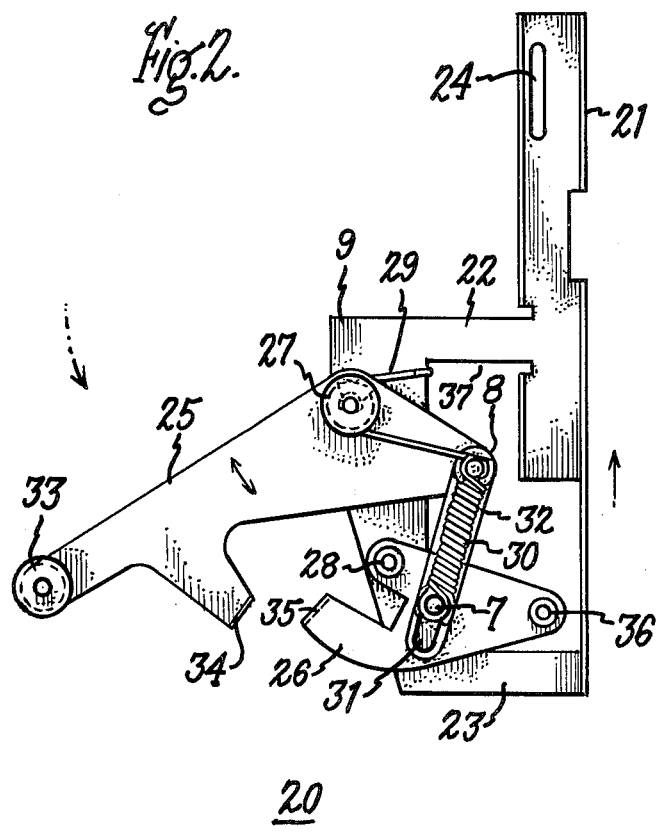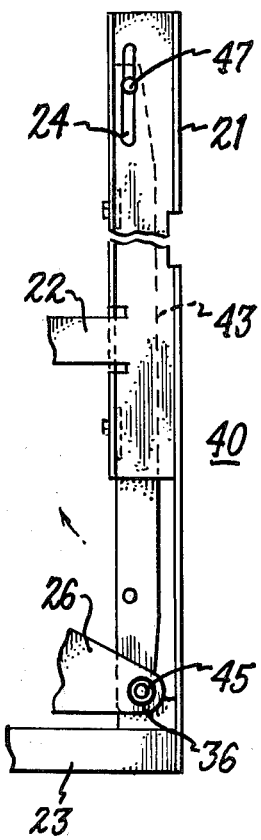

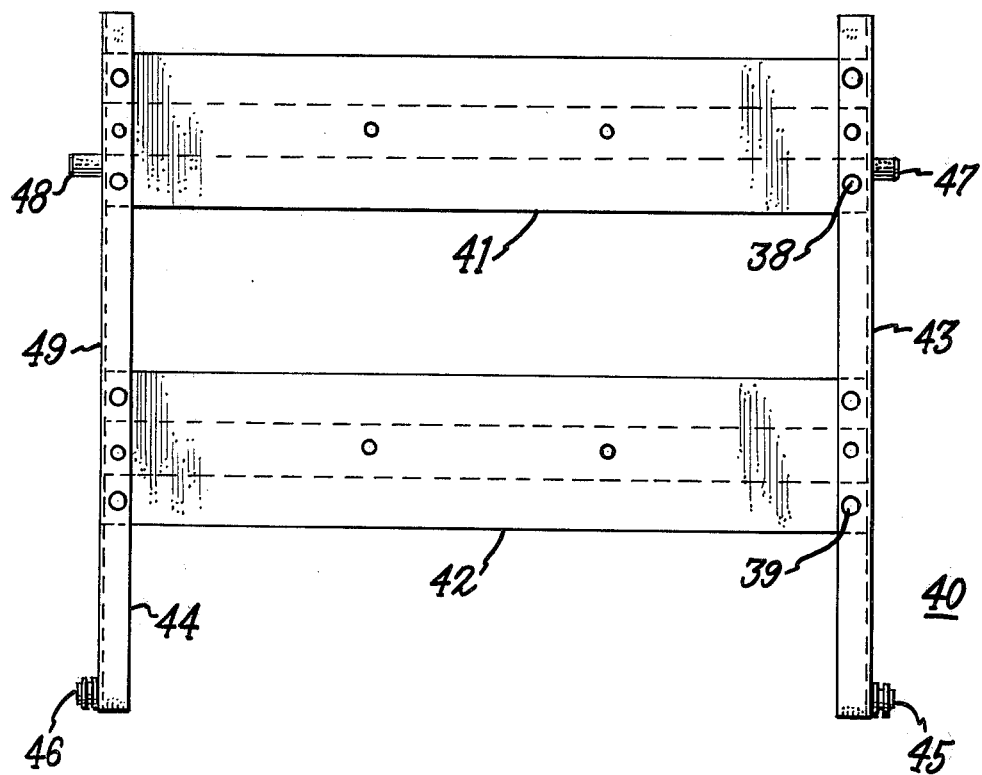

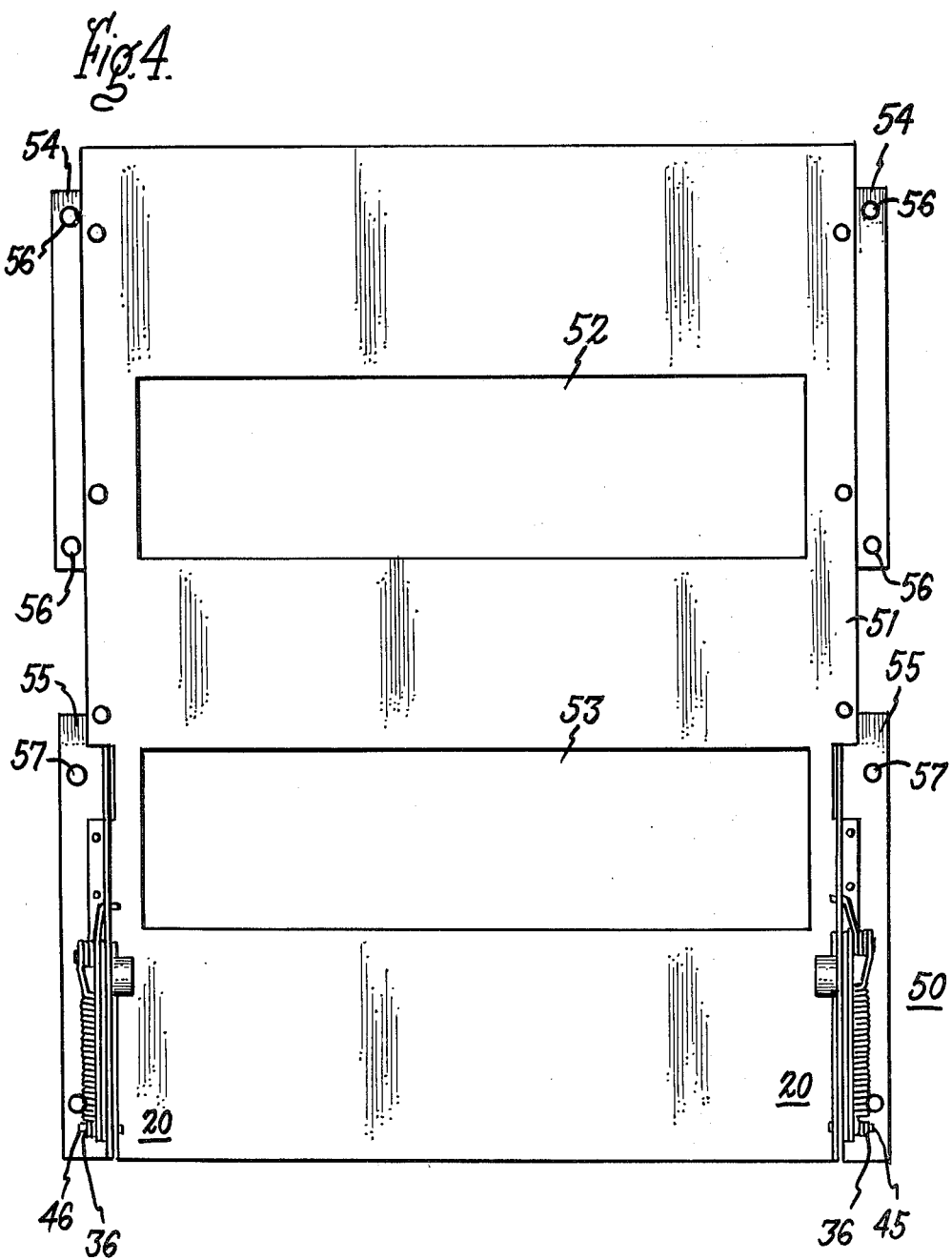

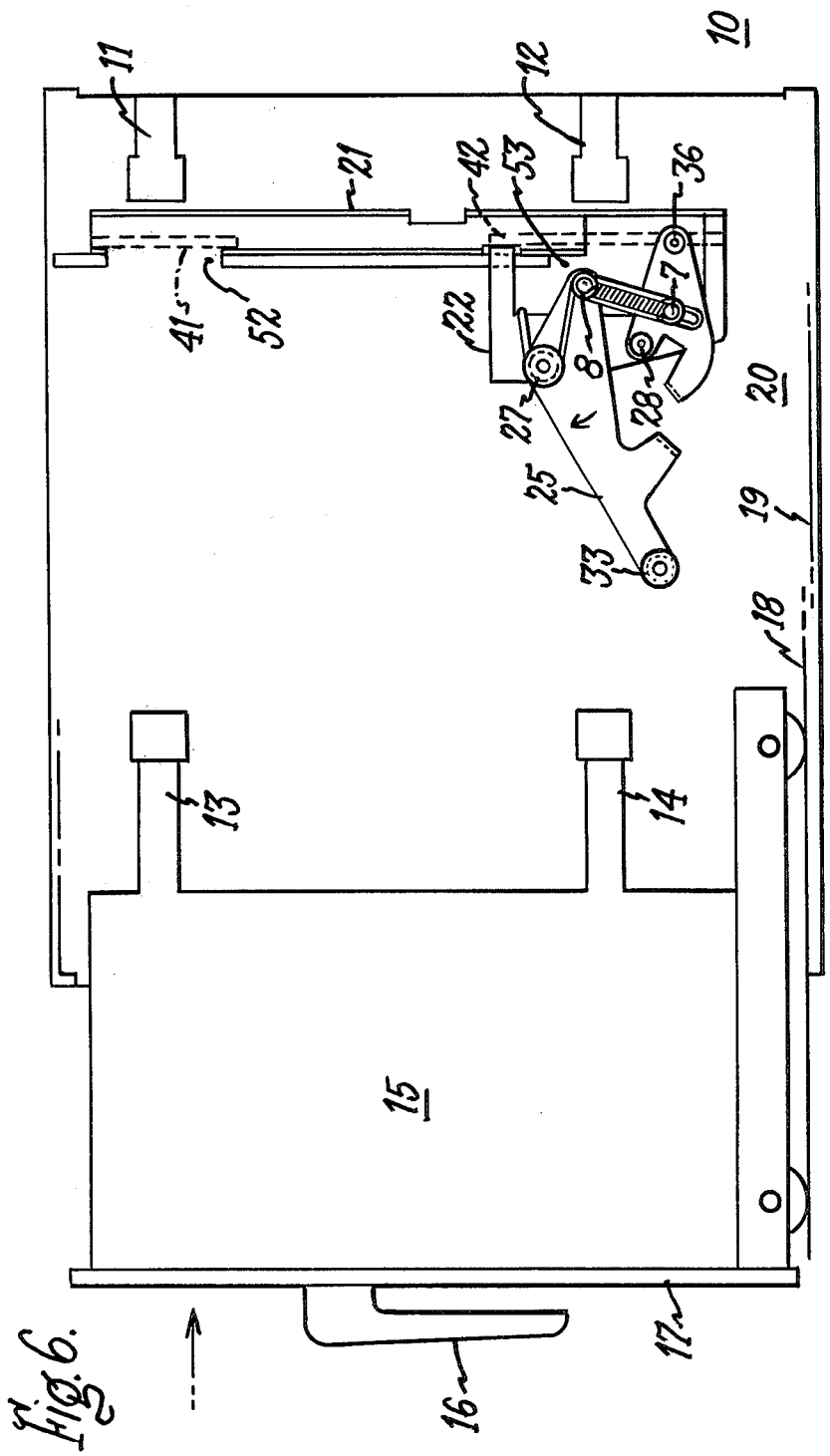

4,443,676

INTERCHANGEABLE SHIELD ARRANGEMENT FOR A CIRCUIT BREAKER COMPARTMENT

BACKGROUND OF THE INVENTION

Shutter units are available within a circuit breaker compartment for preventing inadvertent contact with the compartment power stabs. One such unit is described within U.S. patent application (41DA-6145) which is incorporated herein for purposes of reference. A shutter mechanism is integrally coupled with the circuit breaker assembly for opening a pair of shutters to provide access between circuit breaker receptacles and the compartment power stabs when the circuit breaker is inserted within the compartment. Withdrawal of the circuit breaker unit from the compartment causes the shutter mechanism to close and thereby prevent direct access with the voltage available at the power stabs. U.S. Pat. Nos. 3,614,350, 4,183,073 and 4,285,026 also disclose various configurations of a shutter arrangement within a circuit breaker compartment. In view of the increasing safety requirements for circuit breaker compartments already in operation that do not contain a shutter safety mechanism, there is a need for a field installable shutter safety mechanism that fits circuit breaker compartment designs of various manufacture.

The purpose of this invention is to provide a self-contained shield arrangement for assembling within a circuit breaker compartment in the field, without substantial modification to either the circuit breaker assembly or the circuit breaker compartment.

SUMMARY OF THE INVENTION

The invention comprises a field installable shield unit for a circuit breaker compartment having a linked shield mechanism for blocking the compartment power stabs when the circuit breaker unit is removed from the compartment. The shield mechanism contains a split linkage arrangement of two operative arms connected together by means of two separate pivots. A return spring and an actuating spring opposedly provide for the opening and closing of the shield subassembly upon contact with a portion of the circuit breaker unit. A loss action delay is provided to the shield assembly by means of a slot arrangement on a return link.

BRIEF DESCRIPTION OF THE DRAWINGS

FIG. 2 is a side view of the shield operating mechanism for use with the shield unit of the invention;

FIG. 3 is a front view of the moveable shield assembly used with the shield operating mechanism depicted in FIG. 2;

FIG. 4 is a front view of the fixed shield assembly for use with the moveable shield assembly depicted in FIG. 3;

FIG. 5 is a partial side view of the assembled moveable and fixed shield assemblies shown in FIGS. 3 and 4; and FIG. 6 is a side view of the circuit breaker compartment shown in FIG. 1 including the shield unit of the instant invention.

DESCRIPTION OF THE PREFERRED EMBODIMENT

Figure 1:
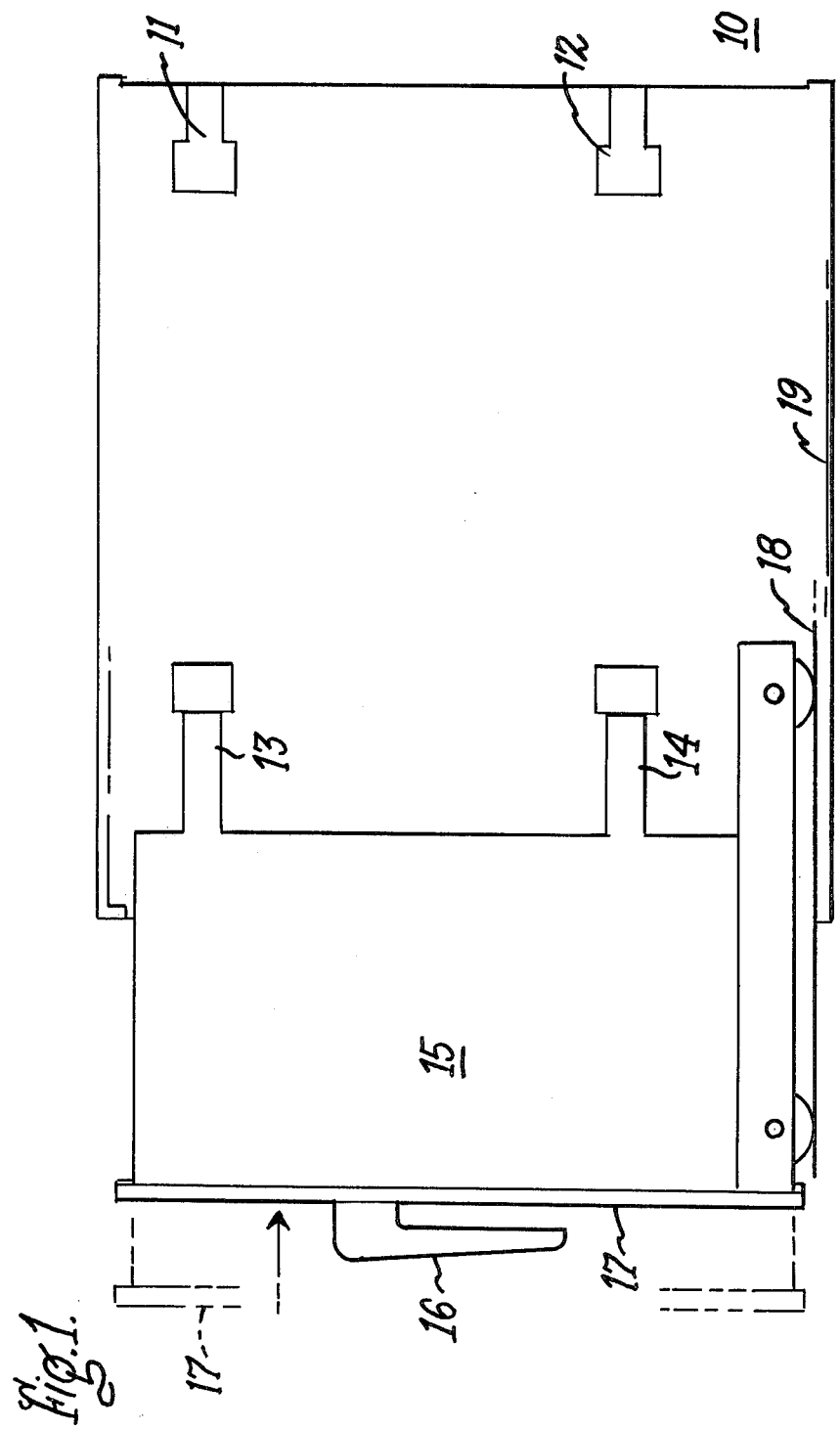
FIG. 1 is a side view of a circuit breaker compartment for use with the shield unit of the invention.

FIG. 1 shows a circuit breaker compartment 10 of the type including a line stab 11 and a load stab 12 for interconnection with a moveable line plug 13 and a moveable load plug 14 attached to the back of a circuit breaker 15. Circuit breaker 15 is of the type containing an operable handle 16 attached to a forward control panel 17 and insertable within compartment 10 by means of a moveable track 18 and a fixed track 19 within circuit breaker compartment 10.

The shield unit of the invention consists of a shield operating mechanism 20 shown in FIG. 2, coupled with the moveable shield assembly 40 of FIG. 3, and the fixed shield assembly 50 of FIG. 4 for employment within circuit breaker 10 of FIG. 1. Shield operating mechanism 20 consists of a side frame 21 having a top extension 22, bottom extension 23 and a forward surface 9. Also contained within side frame 21 is a shield guide slot 24 for operably receiving a guide pin 47 (FIG. 3) when shield operating mechanism 20 is assembled within the circuit breaker compartment 10 shown in FIG. 1. Also connected within shield operating mechanism 20 is a first actuator arm 25 and a second actuator arm 26. First actuator arm 25 is connected with side frame 21 by means of a top pivot 27, and second actuator arm 26 is connected with side frame 21 by means of a bottom pivot 28. First actuator arm 25 is caused to rotate in a counterclockwise direction by contact with a portion of breaker 15 and in a clockwise direction by means of a return spring 29 attached to side frame 21 at one end and to a top pin 8 on actuator arm 25. Actuator spring 30 is connected to pin 8 at one end and to pin 7 at an opposite end. Pin 7 is fixedly attached to second actuator arm 26, causing second actuator arm 26 to move in a counterclockwise direction and in a clockwise direction in a manner to be discussed below in detail.

Return link 32, captivated by pin 8 at one end and by pin 7 at the opposite end, initially positions the relationship between first actuator arm 25 and second actuator arm 26. Return link 32 also forces second actuator arm 26 to rotate in a clockwise direction when return spring 29 rotates first actuator arm 25 in a clockwise direction. Slot 31 in return link 32 allows for relative lost motion between first actuator arm 25 and second actuator arm 26 when second actuator arm 26 is blocked from rotating in a counterclockwise direction while insuring proper positioning between return link 32 and pin 7. For purposes of this disclosure, the term "relative lost motion" means that first actuator arm 25 can move counterclockwise for a fixed distance without causing second actuator arm 26 to rotate in a counterclockwise direction.

Rotation of first actuator arm 25 causes rotation in a counterclockwise direction of second actuator arm 26 due to the action of actuator spring 32. Rotation of second actuator arm 26 in a clockwise direction is caused by the action of return spring 29 and return link 32.

A circuit breaker contact member 33 extends from the surface of first actuator arm 25 for engaging with a portion of the circuit breaker 15 shown in FIG. 1 and for causing first actuator arm 25 to move in a counterclockwise direction in opposition to return spring 29 when circuit breaker 15 is moved along tracks 18, 19 within the circuit breaker compartment 10 of FIG. 1. The counterclockwise rotation of first actuator arm 25 forces actuator spring 30, which is attached to first actuator arm at pin 8, to become extended. The opposite end of actuator spring 30 is attached to pin 7 so that extension of actuator spring 30 forces second actuator arm 26 to rotate in a counterclockwise direction. Projection 34, provided on upper actuator arm 25, contacts stop 35 on second actuator arm 26, causing upper actuator arm 25 to be blocked from further rotation. Projection 34 only contacts stop 35 if second actuator arm 26 is prevented from rotating in a counterclockwise direction.

An opening 36 through second actuator arm 26 provides for operable connection with a moveable shield assembly 40 shown in FIG. 3 and a cutout portion 37 from side frame 21 provides for the motion of first actuator arm 25 and second actuator arm 26 in a close space arrangement without interfering with the motion of first actuator arm 25 in a counterclockwise direction and the motion of second actuator arm 26 in both a clockwise and counterclockwise direction.

Moveable shield assembly 40 comprises a line shield 41 and a load shield 42 fixedly attached to side mounting arms 43 and 49 by means of line shield fasteners 38 and load shield fasteners 39. Fasteners 38 and 39 comprise rivets but may comprise any other suitable fastening means such as screws and welds. Guide pin 47 and guide pin 48 are inserted within shield guide slot 24 (FIG. 2), and it is to be noted that a pair of shield operating mechanisms 20 are provided on either side of moveable shield 40 in order to prevent the inadvertent operation or the intensional operation of the shield unit of the invention by an operator while circuit breaker 15 is in the position shown in FIG. 1. This is an important feature of the invention since the force relationships between return spring 29 and actuator spring 30, of FIG. 2, must be in a predetermined ratio in order to provide sufficient spring force to oppose the manual operation of the shield unit of the invention with the circuit breaker 15 shown in the position indicated in FIG. 1. For purposes of illustration only, one shield operating mechanism 20 will be disclosed herein although it is to be understood that a pair of shield operating mechanisms 20 are to be employed for the reasons discussed above. Guide pin 48 and connecting pin 46 shown on side mounting arm 44 are employed for connecting with the second shield operating mechanism.

FIG. 4 contains a fixed shield assembly 50 for mounting within compartment 10 (FIG. 1) and for carrying moveable shield assembly 40 shown in FIG. 3. Fixed shield assembly 50 consists of a shield housing 51 which can comprise an insulating material such as a glass reinforced plastic resin or a metal such as steel having a thin covering of an insulating resin attached to or coated thereon. The presence of the insulation material is to insure that the electrical insulating path between line stab 11 and load stab 12 of FIG. 1 is not bypassed by the conducting material used within shield housing 51. A line slot 52 is provided within shield housing 51 for access to line stab 11, and load slot 53 is provided within shield housing 51 to provide access to load stab 12 when fixed shield assembly 50 is inserted within compartment 10. A top mounting flange 54 and a bottom mounting flange 55 are provided on both sides of fixed shield assembly 50 for insertion within circuit breaker compartment 10 by means of top and bottom mounting holes 56, 57 and suitable rivets or screws. It is to be clearly understood that fixed shield assembly 50 can be inserted within a circuit breaker compartment such as 10 in FIG. 1 when the circuit breaker 15 is already located at a job site. It is an important feature of this invention that the fixed shield assembly 50 and moveable shield assembly 40 coupled with shield operating mechanism 20 can readily be installed in most existing circuit breaker compartments by merely attaching the fixed shield assembly 50 in the manner just described. Also shown in FIG. 4, on both sides of fixed shield assembly 50, is the shield operating mechanism 20, described earlier in FIG. 2, attached with the moveable shield assembly 40 of FIG. 3 by means of insertion of the connecting pin 45 of the moveable shield assembly 40 of FIG. 3 through connecting hole 36 of the shield operating mechanism more clearly shown in FIG. 2. The assembly between shield operating mechanism 20, moveable shield assembly 40 and fixed shield assembly 50 is shown in FIG. 5 as follows. Guide pin 47 is inserted within shutter guide 24 formed within side frame 21 for guiding the motion of moveable shield assembly 40 relative fixed shield 50 and side frame 21 of shield operating mechanism 20. Connecting pin 45 of moveable shield assembly 40 by operable connection through mounting hole 36 within second actuator arm 26 of shield operating mechanism 20 provides for the sliding movement of side mounting arms 43 and 49 resulting in the motion of line shield 41 and load shield 42 in and out of registration with line slots 52 and load slots 53 shown in FIG. 4. The motion of second actuator arm 26 of FIG. 2 in a clockwise direction moves side mounting arm 43 in a vertical direction by forcing guide pin 47 within shield guide 24 to move line shield 41 and load shield 42 into registration with line slot 52 and load slot 53 to prevent electrical access to corresponding line stabs 11 and load stabs 12. Rotation of second actuator arm 26 in a counterclockwise direction moves line shield 41 and load shutter 42 out of registration with line slot 52 and load slot 53 to provide electrical access to line stab 11 and load stab 12.

As described earlier, contact between contact member 33, shown in FIG. 2, with any portion of the back end of breaker 15 of FIG. 1, forces first actuator arm 25 to rotate in a counterclockwise direction. The counterclockwise rotation of first actuator arm 25 simultaneously removes the force exerted by return spring 29 on second actuator arm 26 and also extends actuator spring 30 by forcing second actuator arm 26 to rotate in a counterclockwise direction, causing a lifting force to be translated by connecting opening 36 on second actuator arm 26 to moveable shield assembly 40 by means of connecting pin 45 shown more clearly in FIG. 3. Sufficient force is then applied to side mounting arms 43, 49 to force moveable shield assembly 40 to move in an upward direction causing line and load shields 41, 42 to move out of registration with line and load slots 52, 53.

Upon withdrawing breaker 15 of FIG. 1 from compartment 10, contact between contact member 33 and the back portion of breaker 15 is removed. First actuator arm 25 is then released from the counterclockwise position, allowing return spring 29 to rotate first actuator arm 25 in a clockwise direction. The motion of first actuator arm 25 forces second actuator arm 26 to rotate in a clockwise direction thereby allowing line shield 41 and load shield 42 to move back in registration with line and load slots 52, 53.

The imposition of shield 41 within circuit breaker compartment 10 is shown in FIG. 6. Shield operating mechanism 20 is in a "normally closed" configuration wherein line shield 41, depicted in dotted lines, is in registry within line slot 52 to electrically and physically block line stab 11 while at the same time load shield 42, also depicted in dotted lines, is shown in registration with load slot 53 to prevent electrical and physical access to load stab 12.

The relationship between return spring 29 and actuator spring 30 of FIG. 2 prevents the movement of shields 41, 42 to an open position when only one of the shield operating mechanisms 20, attached to fixed shield assembly 50 shown in FIG. 4, is actuated. This is an important feature of the invention since it prevents an operator from using one hand to actuate a single operating mechanism 20 and another to contact the exposed stabs 11, 12 if shields 41, 42 were operable by means of only one operating mechanism 20.

In order to describe the working relationship between both shield operating mechanisms, on either side of shields 41, 42 one such mechanism on the opposite side of shields 41, 42 is now described as 20', the opposite actuator and return springs 30', 29', and the opposite contact member as 33'. Although not shown in the drawings, this distinction is required in order to depict the situation wherein circuit breaker 15 is off-center within compartment 10 of FIG. 1 so that only one contact member 33 contacts breaker 15. One operating mechanism 20 becomes actuated so that the associated actuator arm 25 is forced not only to lift shields 41, 42, but also to overcome the non-actuated return spring 29' in the opposite non-actuated operating mechanism 20'. Opposite return spring 29' in non-actuated operating mechanism 20' is selected to have a greater spring force than actuator spring 30 in actuated operating mechanism 20 to prevent shields 41, 42 from operating. It is found that the opposite return spring 29' in non-actuated operating mechanism 20' must be at least 1.5 times greater in force than actuator spring 30 to prevent shields 41, 42 from opening.

Another important feature of this invention is the tolerance provided by the force difference between actuator spring 30 on one side of shields 41, 42 and return spring 29' on the opposite side when both operating mechanism 20, 20' are not actuated simultaneously. The position of engagement of breaker 15 with both contact members 33, 33' of both operating mechanisms 20, 20' would otherwise have to be critically maintained. For example, if one contact member 33 should engage breaker 15 before the opposite contact member 33' during insertion of breaker 15, there would not be sufficient force provided by a single actuator spring 30 to lift shields 41, 42. The lifting of shields 41, 42 before both contact members 33, 33' contact breaker 15 could cause the shields to bind within side frame 21, and prevent breaker 15 from completely entering into compartment 10.

I claim:

1. A shield unit for use within a circuit breaker compartment comprising:
    fixed shield means for insertion within a circuit breaker compartment between electrical power contacts on said circuit breaker and power stab contacts within said compartment;
    moveable shield means connected with said fixed shield means for preventing access to said power stabs when said circuit breaker is at least partially removed from said compartment and for providing access to said power stabs when said circuit breaker is completely within said compartment;
    moveable shield operating means including a fixed member for attaching within said compartment and first and second actuator arms pivotally connected with said fixed member for rotation in a first direction when said circuit breaker contacts a part of said first actuator arm and for rotation in a second direction when said circuit breaker is moved out of contact with said first actuator arm; and
    an actuator spring and a return spring oppposedly coupled for providing a force to said second actuator arm to rotate said second actuator arm and said first actuator arm in said second direction.

2. The shield unit of claim 1 wherein said first actuator arm is connected with said fixed member by means of a first pivot and wherein said second actuator arm is connected with said fixed member by means of a second pivot.

3. The shield unit of claim 3 further including a return link fixedly attached to said first actuator arm at one end and slideably attached to said second actuator arm at an opposite end.

4. The shield unit of claim 1 wherein said actuator spring is attached at one end to said first actuator arm and to said second actuator arm at an opposite end by a pair of pre-located pins.

5. The shield unit of claim 3 wherein said return spring is retained by said fixed member at one end and is coupled with said return link at an opposite end.

6. The shield unit of claim 1 including second shield operating means which contains a second actuator spring and a second return spring, a third actuator arm and a fourth actuator arm, wherein said second return spring exerts a spring force in opposition to said actuator spring, said second return spring force being greater than said actuator spring force for providing a resultant spring force on said second actuator arm preventing said second actuator arm from rotating in said first direction until said third actuator arm is contacted by a portion of said breaker.

7. The shield unit of claim 1 wherein said moveable shield includes at least one shield connecting between a pair of mounting arms.

8. The shield unit of claim 7 wherein at least one of said mounting arms includes means for connecting with said second actuator arm causing said mounting arms and said moveable shield to move in the same direction as said second actuator arm.

9. The shield unit of claim 8 wherein said fixed member includes guide means for receiving a guide pin connected with said moveable shield for directing the motion of said moveable shield.

10. The shield unit of claim 1 wherein said fixed shield includes means defining at least one opening for providing access to said power stab.

11. The shield unit of claim 10 wherein said moveable shield is arranged relative to said fixed shield for moving said shield into and out of registry with said opening when said second actuator arm moves in said first or said second direction.

12. The shield unit of claim 1 wherein said first actuator arm contains a projection thereon for contact with a stop member on said second actuator arm, said contact member and said stop member being in alignment with each other.

13. The shield unit of claim 3 further including means defining an opening within said fixed member for allowing clearance between said first actuator arm, said second actuator arm and said return link without contact with said fixed member.

14. The shield unit of claim 2 further including a forward surface connecting between a top extension and a bottom extension projecting from said fixed member wherein said first pivot is attached above said second pivot on said forward surface.

15. A shield unit for use within circuit breaker compartments comprising:
 a moveable shield assembly operably connected with a fixed shield assembly, said moveable shield assembly having a line shield and a load shield extending between a pair of mounting arms, said fixed shield containing means defining access to a line stab and means defining access to a load stab, said line and load shields moving in and out of registry with said line and load access means for preventing connection with line and power stabs within a circuit breaker compartment when said line and load shields are in registration with said line and load access means and for providing connection with said line and load stabs when said line and load shields are out of registration with said line and load access means;
 a shield operating mechanism having a pair of first and second actuator arms pivotally connected with a side frame for operating said fixed and said moveable shields, said first actuator arm connected with said second actuator arm by means of an actuator spring for moving said second actuator arm in a counterclockwise direction when said first actuator arm is moved in a counterclockwise direction; and
 a return spring connected at one end to a portion of said side frame and with said first actuator arm at an opposite end.

16. The shield assembly of claim 15 further including a return link attached at one end to said first actuator arm and attached to said second actuator arm at an opposite end, said second actuator arm being connected with at least one of said moveable shield side operating arms to cause said side operating arms to move in a vertical direction when said second actuator arm is caused to move in a counterclockwise direction.

17. The shield unit of claim 16 including a second actuator spring and a second return spring within a second shield operating mechanism wherein said second return spring exerts an opposing force to said actuator spring to prevent said second actuator arm from operating said moveable shield mechanism until said second operating mechanism becomes actuated by a circuit breaker.

18. The shield assembly unit of claim 16 wherein said return spring exhibits a greater force than said actuator spring.

19. The shield assembly unit of claim 18 wherein the ratio of said return spring force to said actuator spring force is equal to or in excess of 1.5.

20. A shield assembly unit for circuit breaker compartments comprising:
 a side frame having top and bottom extension members and a forward surface connecting between said top and bottom extension members pivotally supporting a first actuator arm and a second actuator arm;
 a return spring retained at one end by said top extension and at an opposite end by a pin on said first actuator arm;
 an actuator spring connected to said first actuator arm pin at one end and to said second actuator arm at an opposite end, said actuator spring causing said second actuator arm to rotate in response to motion applied to said first actuator arm by contact with a circuit breaker;
 a return link connected to said first actuator arm at one end and to said second actuator arm at an opposite end for moving said second actuator arm in response to motion applied to said first actuator arm by said return spring;
 a moveable shield assembly consisting of a pair of mounting arms joined by a line shield and a load shield, said moveable shield assembly having a connector pin for insertion within an opening at one end of said second actuator arm and a guide pin for insertion within a guide slot within said side frame member, said moveable shield assembly being moved in a vertical upward direction when said second actuator arm is caused to move in a counterclockwise direction; and
 a fixed shield assembly consisting of a housing having means defining a line slot and means defining a load slot whereby said line and load shields are caused to move into registration with said line and load means to provide access to line and load stabs within said circuit breaker, and to move out of registration with said line and said load means to prevent access to said line and load stabs.

* * * * *